(12) United States Patent
Nakagawa et al.

(10) Patent No.: US 6,446,777 B1
(45) Date of Patent: Sep. 10, 2002

(54) ONE-WAY CLUTCH

(75) Inventors: Yoshihiro Nakagawa, Kashiwara; Kouji Kitahata, Osaka; Nobuyuki Ishibashi, Kashiwara, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/630,640

(22) Filed: Aug. 1, 2000

(30) Foreign Application Priority Data

Aug. 5, 1999 (JP) .............................. 11-222459

(51) Int. Cl.[7] .............................. F16D 41/07
(52) U.S. Cl. .............................. 192/45.1
(58) Field of Search .............................. 192/45.1, 41 A

(56) References Cited

U.S. PATENT DOCUMENTS 3,790,178 A * 2/1974 Cameron ............... 384/489
5,139,123 A * 8/1992 Rutke ................... 192/45.1
5,337,869 A * 8/1994 Zlotek .................. 192/45.1

FOREIGN PATENT DOCUMENTS

JP 59-194136 * 11/1984
JP 11-247902   9/1999

\* cited by examiner

Primary Examiner—Rodney H. Bonck
(74) Attorney, Agent, or Firm—Smith Gambrell & Russell LLP

(57) ABSTRACT

In a one-way clutch, an outer retainer includes tapered surfaces formed by chamfering axially opposite side edges of an outermost part at a projection of the outer retainer, thereby facilitating the assembly of the clutch in an outer ring. In addition, a sufficient contact width is provided between the outer ring and the projection by forming the tapered surfaces at axially opposite ends of the outer retainer, thereby preventing the occurrence of cracks in the outer retainer.

3 Claims, 13 Drawing Sheets

ONE-WAY CLUTCH

FIELD OF THE INVENTION

The present invention relates to a one-way clutch for use, for example, in automotive transmissions.

DESCRIPTION OF THE PRIOR ART

FIG. 20 is a sectional view showing a conventional one-way clutch assembly 100. The one-way clutch assembly 100 is typically employed by the automotive torque converter or the like as means for transmitting motive force only in one direction. In the figure, a synthetic-resin outer retainer 101 is press-fitted in an outer ring 50. Likewise, a synthetic-resin inner retainer 102 is press-fitted on an unillustrated inner ring.

FIG. 21 is a sectional view showing a state in which the one-way clutch 100 (only the outer retainer 101 is shown) is press-fitted in the outer ring 50. In this process, an edge 101a of an outermost part of the outer retainer 101 abuts against the outer ring 50, making it difficult to press-fit the outer retainer into the outer ring 50. Hence, it is not easy to assemble the one-way clutch 100 in the outer ring 50.

Aside from the above problem, the practical use of the one-way clutch assembly 100 involves the temperature elevation thereof, causing tensile stress in an inside circumferential surface of the outer retainer 101. In a few cases, this may result in the occurrence of cracks in the outer retainer 101.

IN THE SPECIFICATION

In view of the foregoing, it is an object of the present invention to provide a one-way clutch easy to assemble in the outer ring. The present invention has another object to provide the one-way clutch adapted to prevent the occurrence of cracks in the outer retainer.

A one-way clutch according to the invention comprises:

sprags circumferentially arranged at predetermined space intervals, an outer retainer and an inner retainer for respectively retaining an outer side and inner side of the sprags, and A spring for biasing the sprags in one circumferential direction, wherein (1) said outer retainer has a general annular form with a predetermined axial width and includes outwardly projected projections and pockets with said sprags inserted therethrough, said projections and pockets being alternately arranged in the circumferential direction, wherein an outermost part at each of said projections has its axially opposite side edges chamfered;

(2) said outer retainer and said projections are integrally made of resin material; and (3) a contact width of said outermost part with an outer ring in an axial direction is greater than an open width of said pocket in an axial direction of said outer retainer.

According to the one-way clutch featured by the above item (1), the chamfered portions of the outer retainer abut against an inside edge of the outer ring when the outer retainer is press-fitted therein. Hence, the outer retainer is guided in a manner to bring its axis into accurate alignment with the axis of the outer ring. This provides for smooth press-fitting of the one-way clutch, facilitating the assembly thereof in the outer ring.

Further, the one-way clutch featured by the above items (2) and (3) ensures a sufficiently great axial contact width between the projection and the outer ring. Accordingly, the outer retainer does not suffer the great tensile stress in its inside circumferential surface even when the outer retainer is thermally expanded due to the evaluated temperature. As a result, the occurrence of cracks is prevented.

DESCRIPTION OF THE PREFERRED EMBODIMENTS

Figure 1:
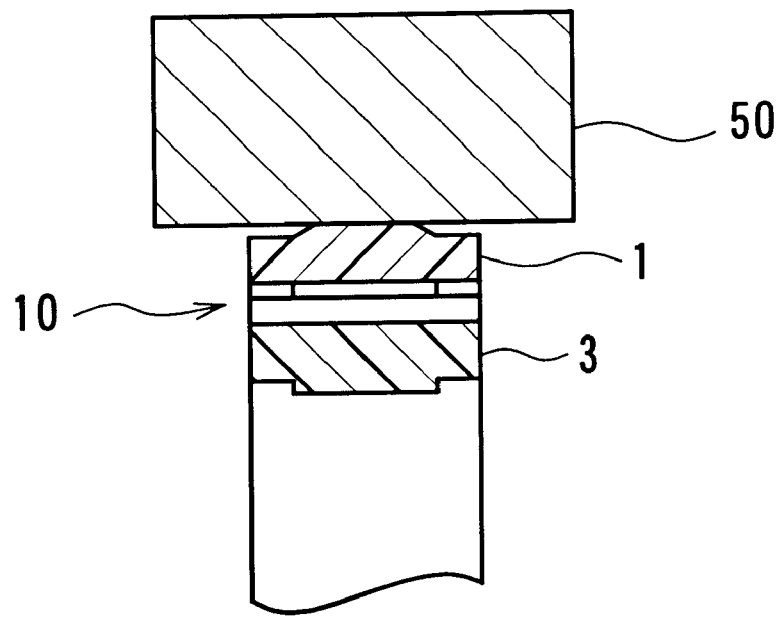
FIG. 1 is a diametrical sectional view showing a one-way clutch press-fitted in an outer ring in accordance with a first embodiment of the present invention.
Figure 2:
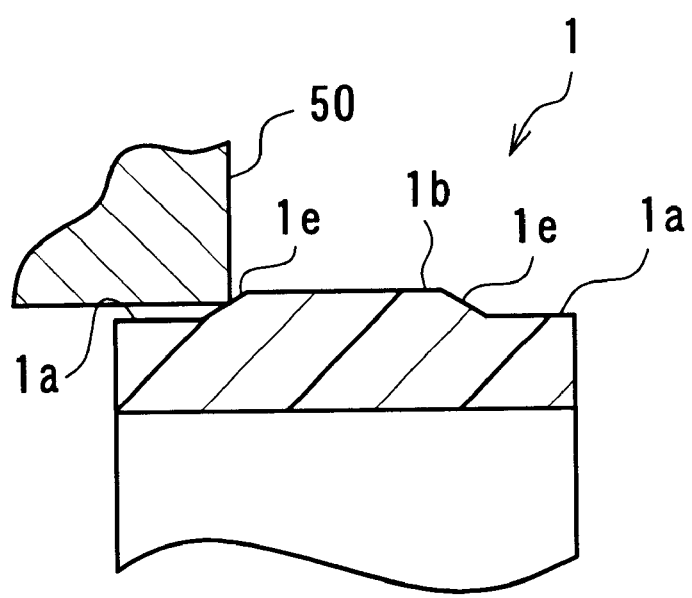
FIG. 2 is a sectional view of the above one-way clutch showing a relation between the outer ring and an outer retainer being press-fitted therein.
Figure 3:
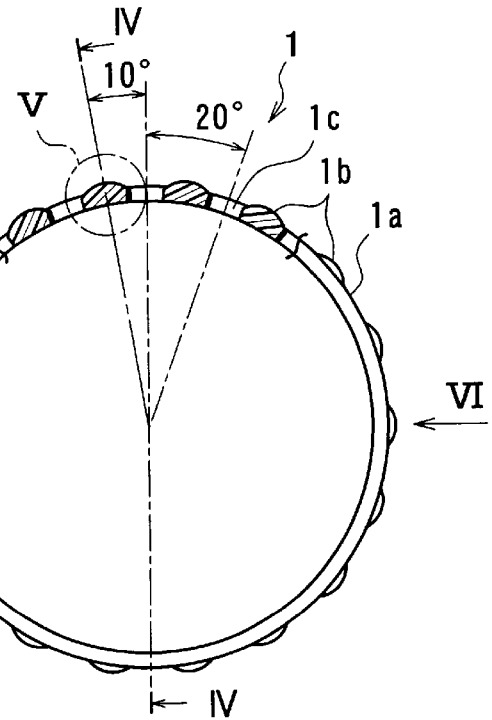
FIG. 3 is a front view showing the above outer retainer.

FIG. 1 to FIG. 9 illustrate a one-way clutch according to a first embodiment of the present invention. First, a mode of an outer retainer 1 will be described with reference to FIG. 3 to FIG. 7. FIG. 3 is a front view of the outer retainer 1

Figure 4:
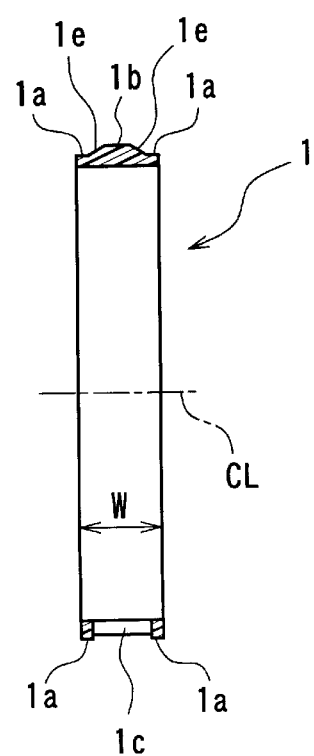
FIG. 4 is a sectional view taken on the line IV—IV in FIG. 3.
Figure 5:
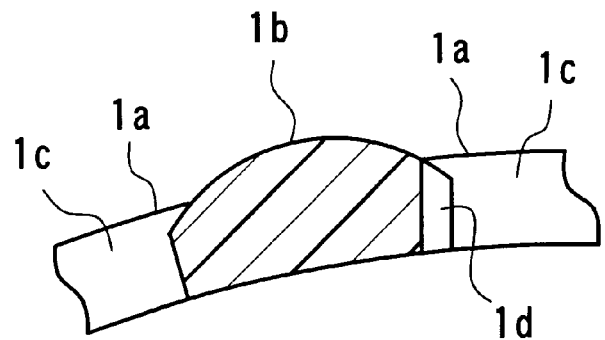
FIG. 5 is an enlarged view of a portion V in FIG. 3.
Figure 6:
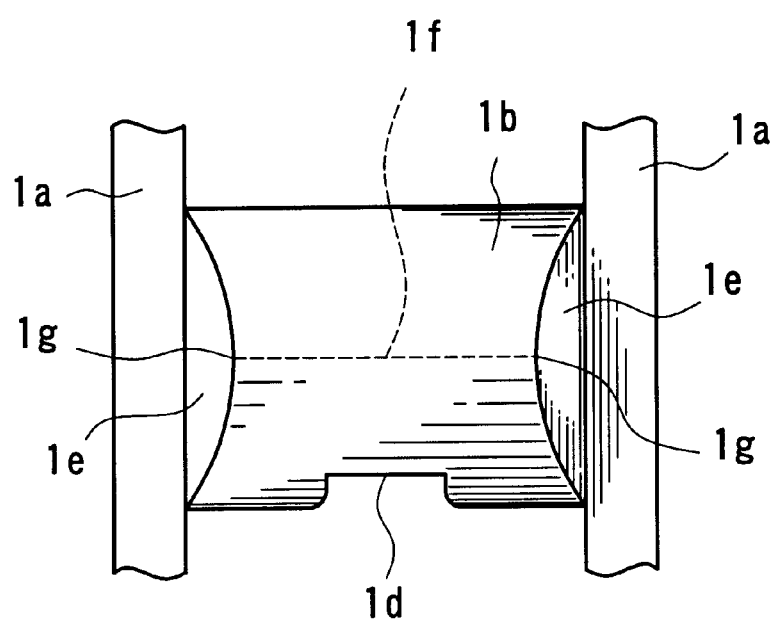
FIG. 6 is a view seen along the arrow VI in FIG. 3.
Figure 7:
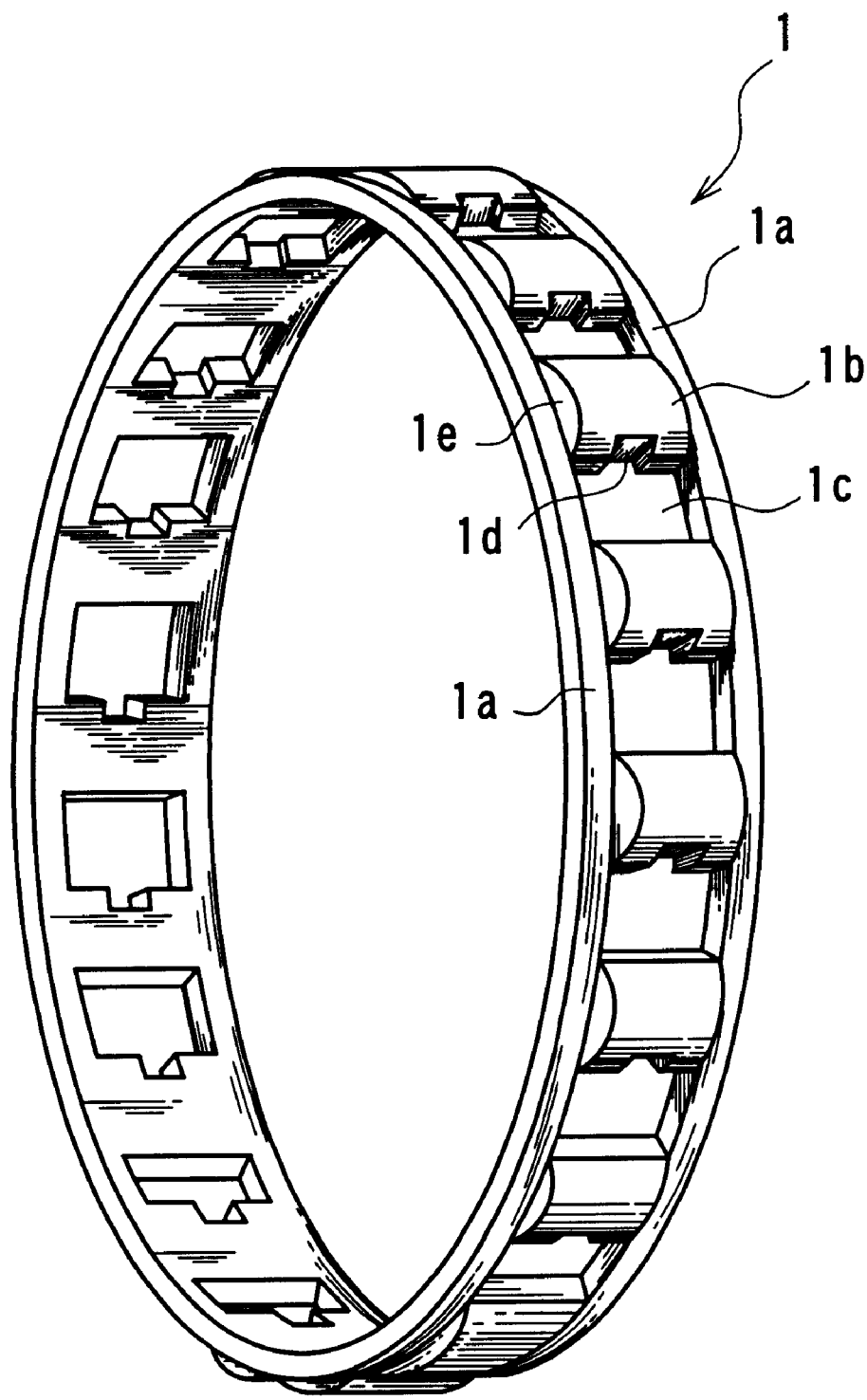
FIG. 7 is a perspective view showing the above outer retainer.

(including a fragmentary sectional view), whereas FIG. 4 is a sectional view taken on the line IV—IV in FIG. 3. FIG. 5 is an enlarged view showing a portion V in FIG. 3, whereas FIG. 6 is a view seen along the arrow VI in FIG. 3. FIG. 7 is a perspective view of the outer retainer 1. Referring to these figures, the outer retainer 1 is integrally formed of a synthetic resin material (such as, Nylon 66 reinforced with glass fibers) in one molding step. The outer retainer 1 has a general annular shape and a predetermined width W with respect to an axial direction CL (FIG. 4). More specifically, the outer retainer 1 includes, as shown in FIG. 7, annular portions 1a disposed at axially opposite ends, and a plurality of vault-like projections 1b formed between these annular portions 1a and projected radially outwardly in an arcuate fashion (as seen from an axial end). The projections 1b and pockets (openings) 1c are circumferentially arranged in an alternating manner.

The projection 1b includes a recess 1d centrally of one side thereof with respect to the circumferential direction. As seen in FIG. 4 and FIG. 6, the projection 1b is formed with tapered surfaces 1e at axially opposite ends thereof. Crests of the tapered surfaces 1e define axially opposite side edges 1g of an outermost part 1f at the projection 1b (FIG. 6). In other words, the presence of the tapered surfaces 1e gives the projection 1b such a shape that the outermost part 1f is chamfered at the axially opposite side edges 1g.

Figure 8:
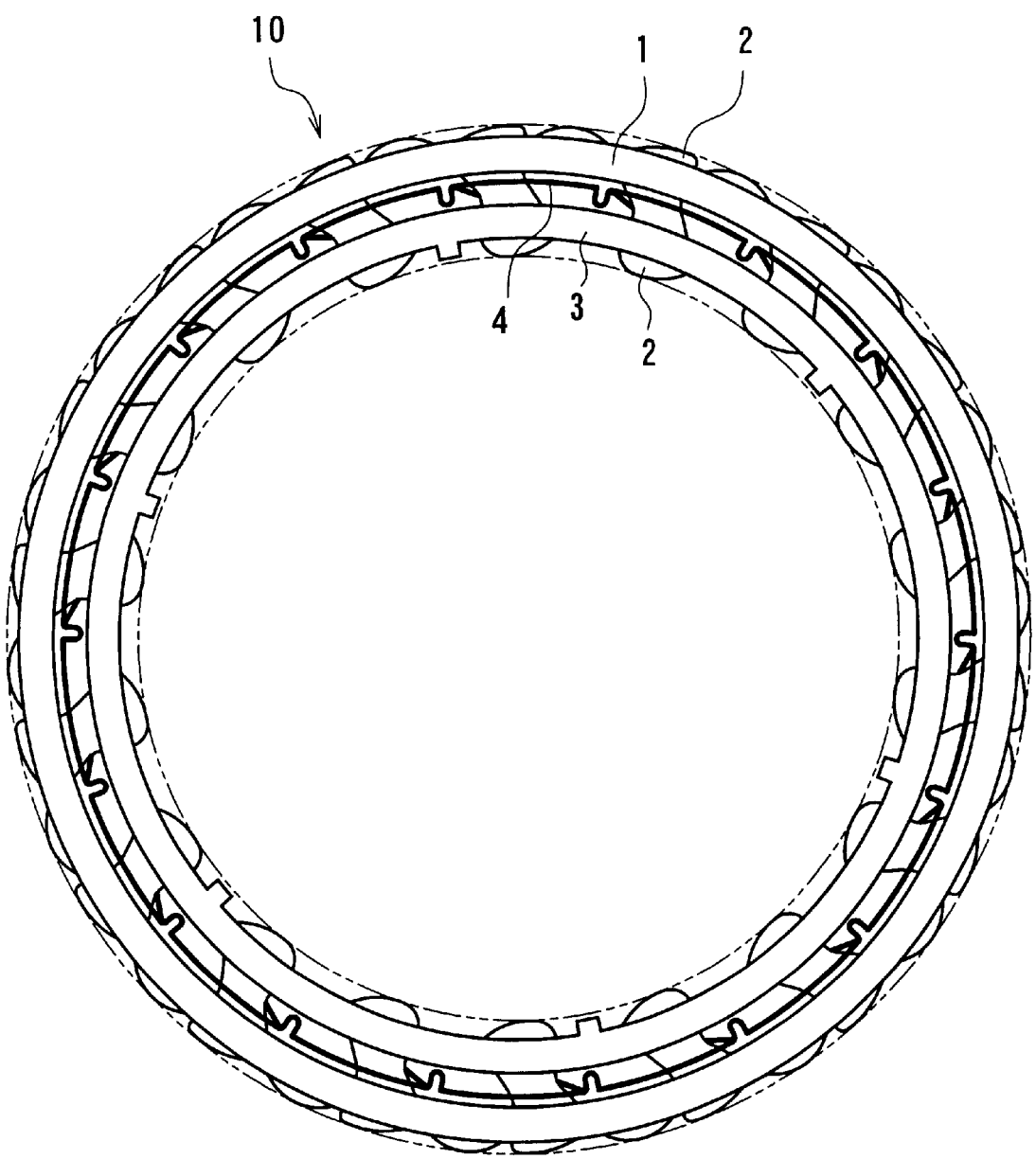
FIG. 8 is a front view showing the one-way clutch employing the above outer retainer.
Figure 9:
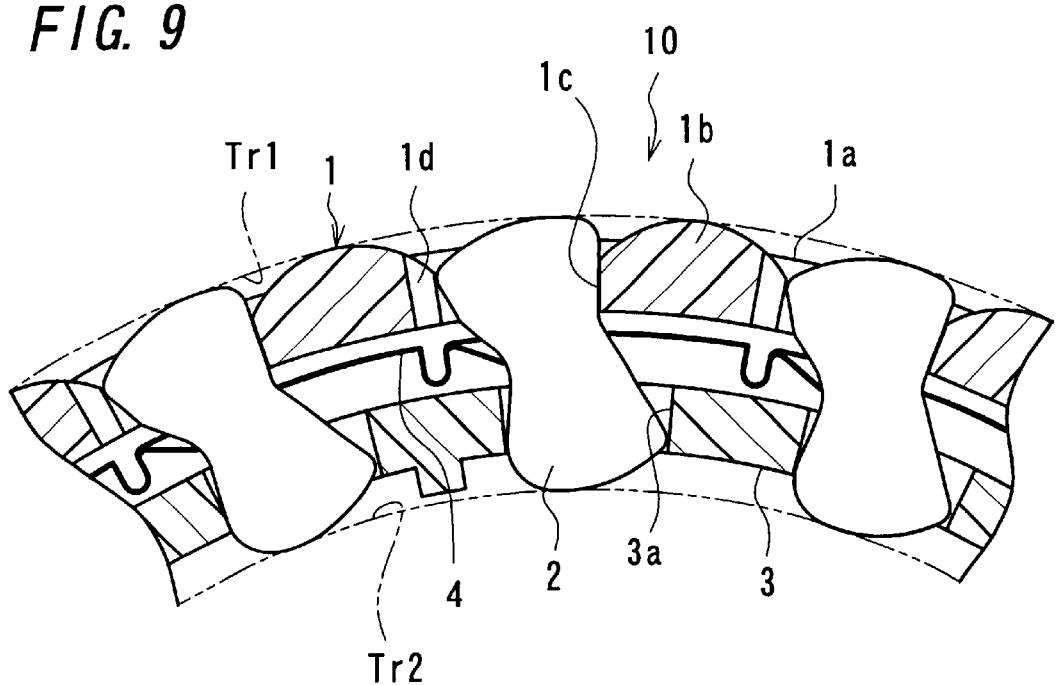
FIG. 9 is a sectional view of the above one-way clutch as seen in the same direction as in FIG. 8.

FIG. 8 is a front view of a one-way clutch 10 employing this outer retainer 1. FIG. 9 is a sectional view of the one-way clutch 10 as seen in the same direction as in FIG. 8. In FIG. 8 and FIG. 9, the one-way clutch 10 includes sprags 2 circumferentially arranged at predetermined space intervals, the outer retainer 1 for retaining an outer side (radially) of the sprags 2, an inner retainer 3 for retaining an inner side of the sprags 2, a ribbon spring 4 for biasing the sprags 2 in one circumferential direction (clockwise in this example). The inner retainer 3 is an annular member formed of the same material as the outer retainer 1. As shown in FIG. 9, the inner retainer 3 includes pockets 3a of the same number as the pockets 1c of the outer retainer 1. These pockets 3a are circumferentially arranged at predetermined space intervals. The sprags 2 are mounted in the pockets 1c and 3a of the outer and inner retainers 1 and 3. The sprags 2 are also capable of coming in and out of the recesses 1d of the projections 1b.

Assumed that the one-way clutch 10 of the above arrangement is mounted between an unillustrated outer ring and inner ring, the sprags 2, in the state shown in FIG. 9, are in contact with a track face Tr1 of the outer race and a track face Tr2 of the inner race. When the inner-race track face Tr2 rotates counterclockwise relative to the outer-race track face Tr1, the sprags 2 are turned clockwise, tending to erect. Thus, the sprags 2 rigidly lock the outer-race track face Tr1 and the inner-race track face Tr2 to each other, allowing unitary rotation of the inner and outer races. When, on the other hand, the inner-race track face Tr2 rotates clockwise relative to the outer-race track face Tr1, the sprags 2 are turned counterclockwise against the ribbon spring 4. As a result, the sprags 2 no more act as struts between the inner and outer races, so that the rotation of either one of the inner and outer races is not transmitted to the other race.

FIG. 1 is a diametrical sectional view of the one-way clutch 10 press-fitted in the outer ring 50, whereas FIG. 2 is a sectional view showing a relation between the outer ring 50 and the outer retainer 1 being press-fitted therein. As seen in FIG. 2, the outer retainer 1 has the tapered surface 1e. The tapered surface 1e abuts against an inside edge of the outer ring 50 when the one-way clutch 10 is inserted into the outer ring 50. Thus, the outer retainer 1 is guided by the outer ring 50 in a manner to bring its axis into accurate alignment with the axis of the outer ring 50. Accordingly, the one-way clutch 10 is smoothly inserted into the outer ring 50.

Hence, the one-way clutch 10 is readily assembled in the outer ring 50.

Figure 10:
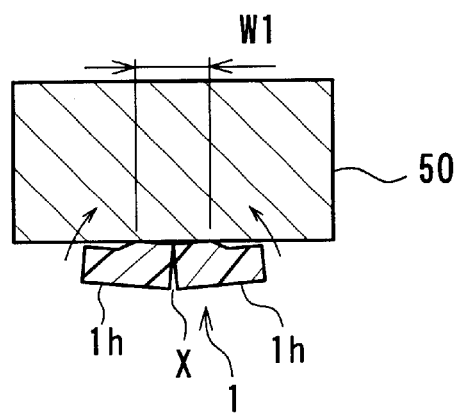
FIG. 10 is a sectional view showing a relation between the above outer retainer and the outer ring.

When elevated in temperature in the practical use, the one-way clutch may suffer the occurrence of cracks in a few cases. In the thermally expanded outer retainer 1, as shown in FIG. 10, tensile stress is produced in its inside circumferential surface 1h because its opposite ends tend to deform in directions of the arrows in the figure. This may result in a crack X. It is thought that such a phenomenon results from that a contact width W1 between the outer retainer 1 and the outer ring 50 is considerably smaller than an overall width of the outer retainer 1. Second and third embodiments of the present invention hereinbelow contemplate the prevention of the occurrence of such cracks.

Figure 11:
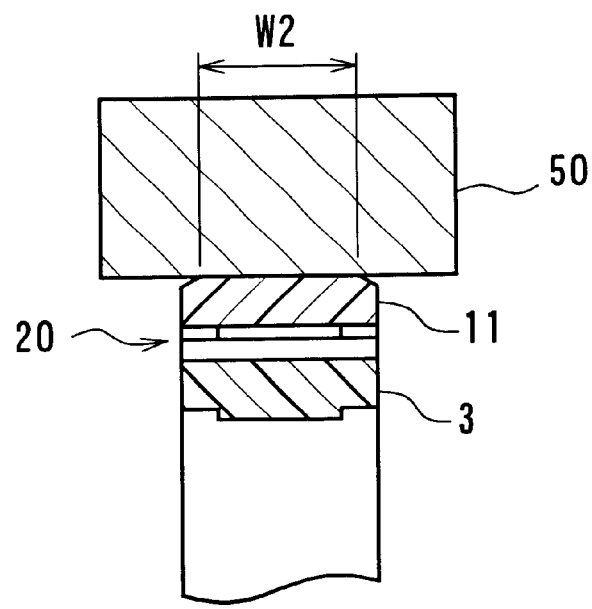
FIG. 11 is a diametrical sectional view showing a one-way clutch press-fitted in the outer ring in accordance with a second embodiment of the present invention.
Figure 12:
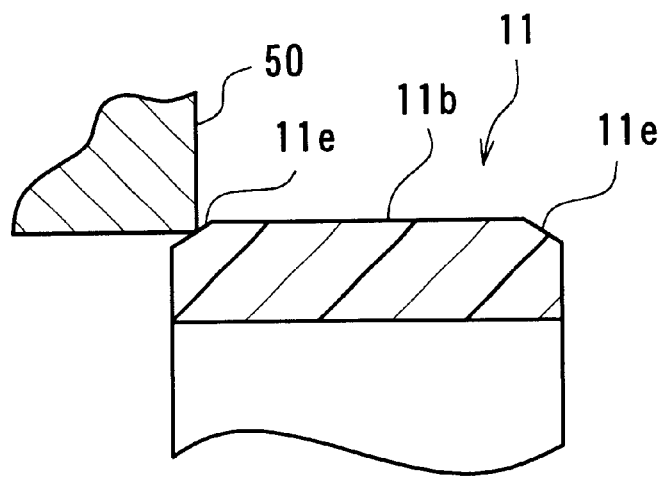
FIG. 12 is a sectional view of the one-way clutch in accordance with the second embodiment for showing a relation between the outer ring and an outer retainer being press-fitted therein.
Figure 13:
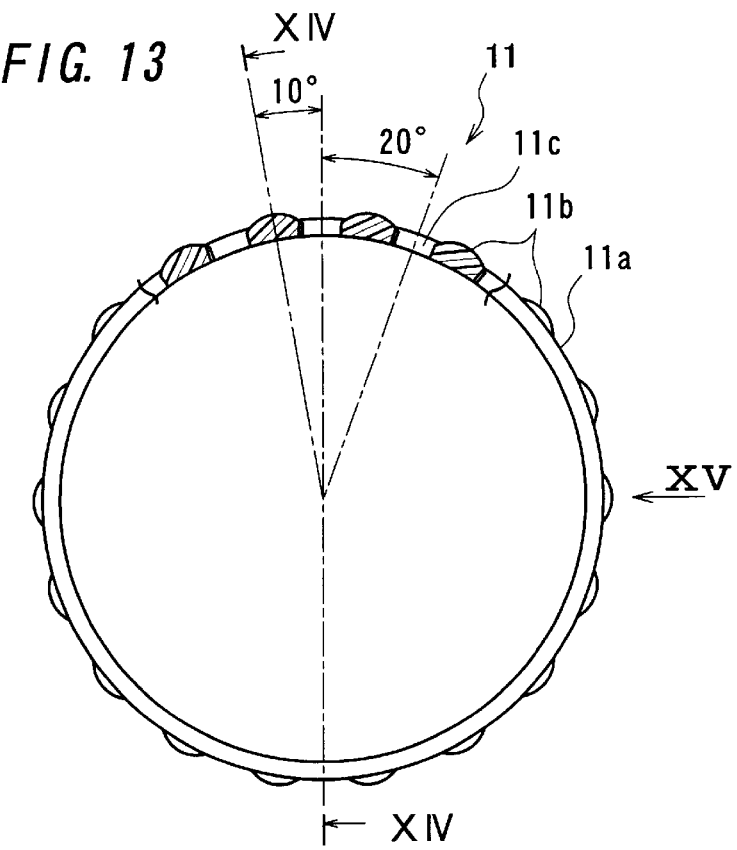
FIG. 13 is a front view showing the outer retainer of the one-way clutch in accordance with the second embodiment.
Figure 14:
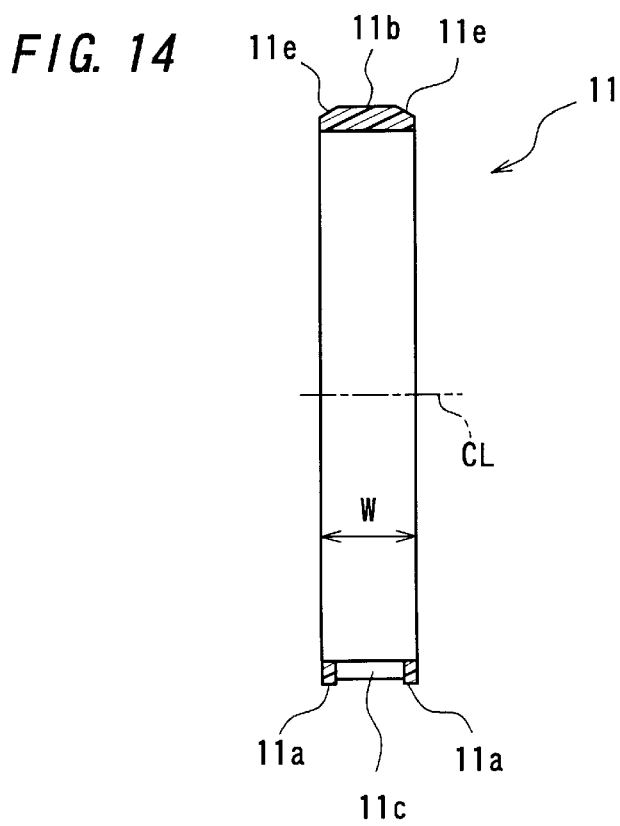
FIG. 14 is a sectional view taken on the line XIV—XIV in FIG. 13.
Figure 15:
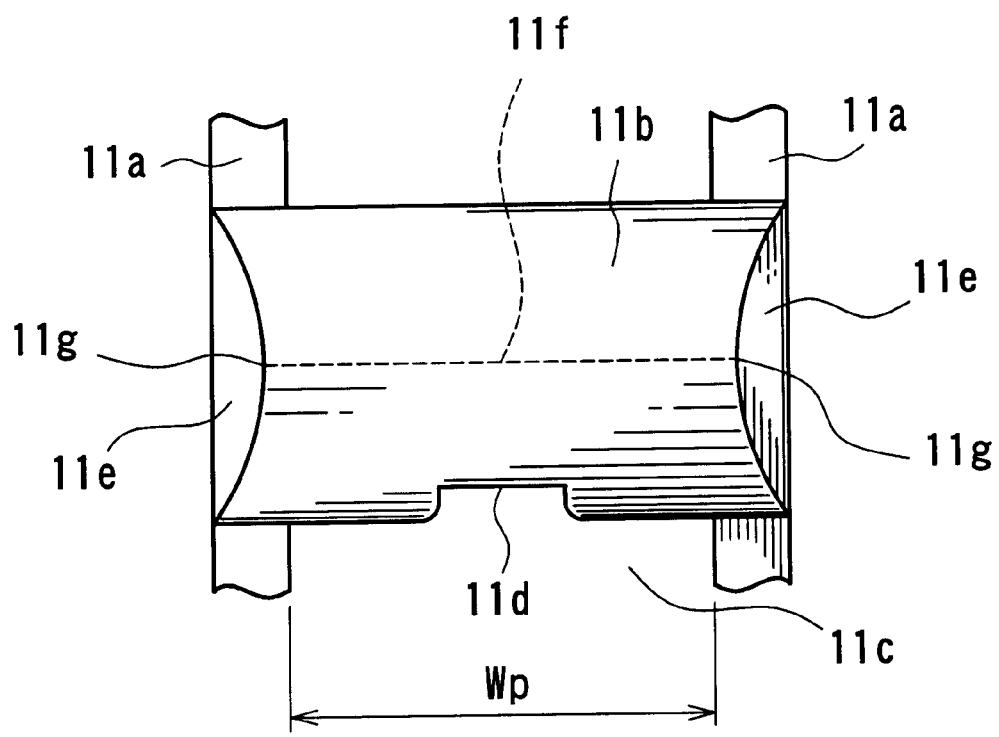
FIG. 15 is a view seen along the arrow XV in FIG. 13.
Figure 16:
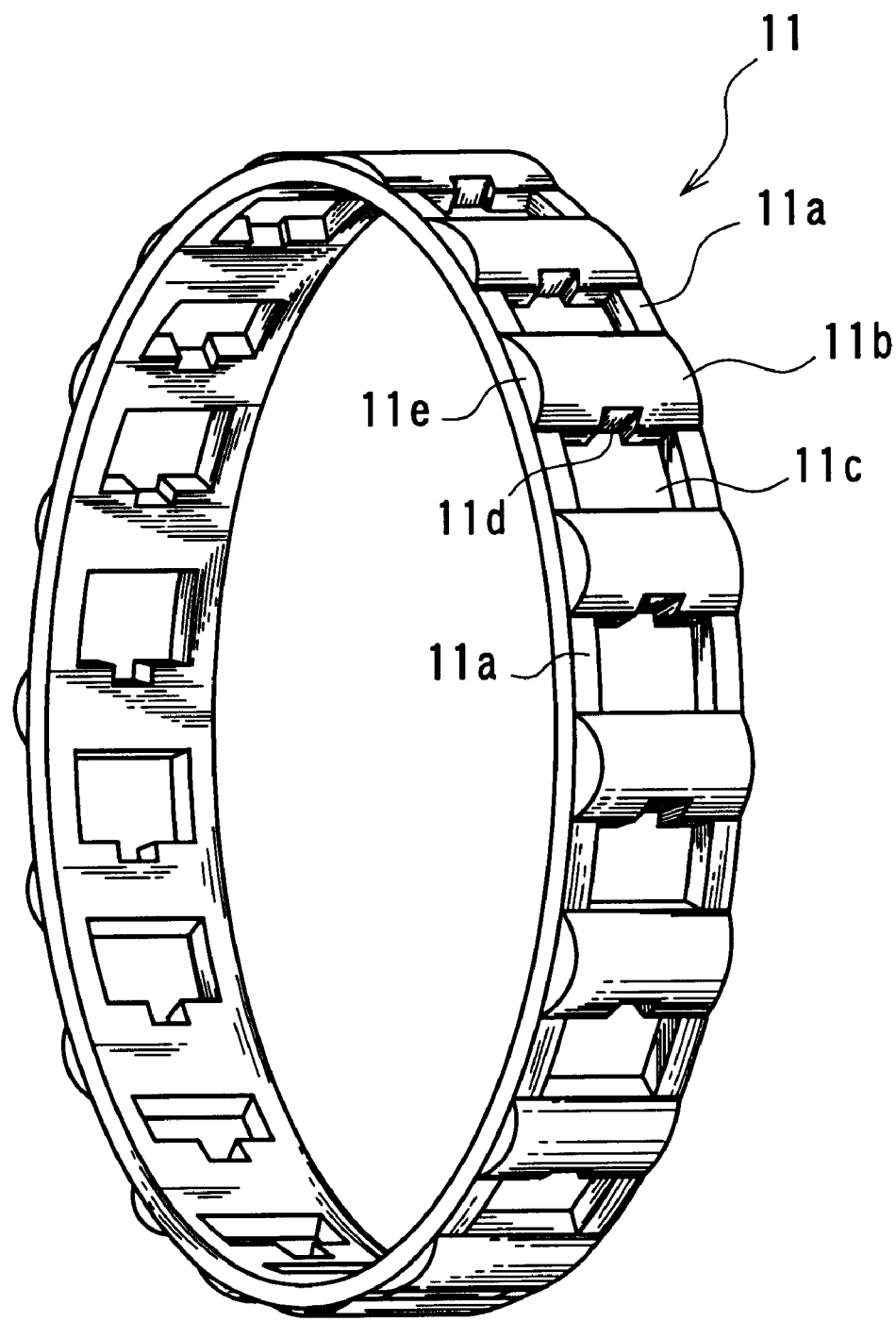
FIG. 16 is a perspective view showing the outer retainer of the one-way clutch in accordance with the second embodiment.

FIG. 11 to FIG. 16 illustrate a one-way clutch 20 according to the second embodiment, which differs from the first embodiment in the mode of an outer retainer 11. FIG. 13 is a front view of the outer retainer 11 (including a fragmentary sectional view), whereas FIG. 14 is a sectional view taken on the line XIV—XIV in FIG. 13. FIG. 15 is a view seen along the arrow XV in FIG. 13, whereas FIG. 16 is a perspective view of the outer retainer 11. Likewise to the first embodiment, the outer retainer 11 is integrally formed of the synthetic resin material in one molding step, having a general annular shape. Further, the outer retainer 11 has a predetermined width W with respect to the axial direction (FIG. 14). In FIG. 15 and FIG. 16, an annular portion 11a, projection 11b, pocket 11c, recess 11d, tapered surface 11e, outermost part 11f and axial side edge 11g correspond to the like portions 1a to 1g of the first embodiment, respectively. The difference from the outer retainer 1 of the first embodiment is that the tapered surfaces 11e are integrally formed over the annular portions 11a. The axially opposite side edges 11g, defining the respective crests of the tapered surfaces 11e, are relatively located laterally outward of an open width Wp of the pocket 11c, as shown in FIG. 15.

FIG. 11 is a diametrical sectional view of the one-way clutch 20 press-fitted in the outer ring 50, whereas FIG. 12 is a sectional view showing a relation between the outer ring 50 and the outer retainer 11 being press-fitted therein. When the one-way clutch 20 employing the outer retainer 11 is inserted into the outer ring 50, the tapered surface 11e abuts against the inside edge of the outer ring 50. Thus, the outer retainer 11 is guided by the outer ring 50 in a manner to bring its axis into accurate alignment with the axis of the outer ring 50. Accordingly, the one-way clutch 20 is smoothly press-fitted in the outer ring 50. Likewise to the first embodiment, the one-way clutch 20 is readily assembled in the outer ring 50.

As shown in FIG. 11, a contact width W2 between the outer retainer 11 and the outer ring 50 is greater than the contact width W1(FIG. 10) of the first embodiment. Therefore, the outer retainer 11 is less susceptible to deformation due to thermal expansion, so that the great tensile stress does not occur in its inside circumferential surface. This positively prevents the crack occurrence.

Figure 17:
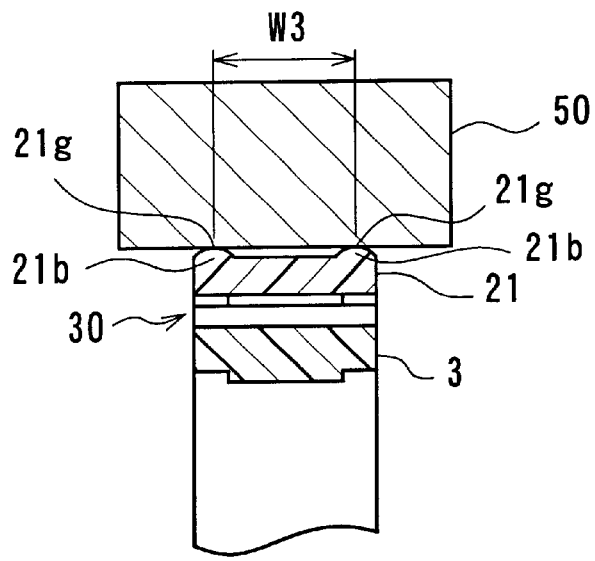
FIG. 17 is a diametrical sectional view showing a one-way clutch press-fitted in the outer ring in accordance with a third embodiment of the present invention.
Figure 18:
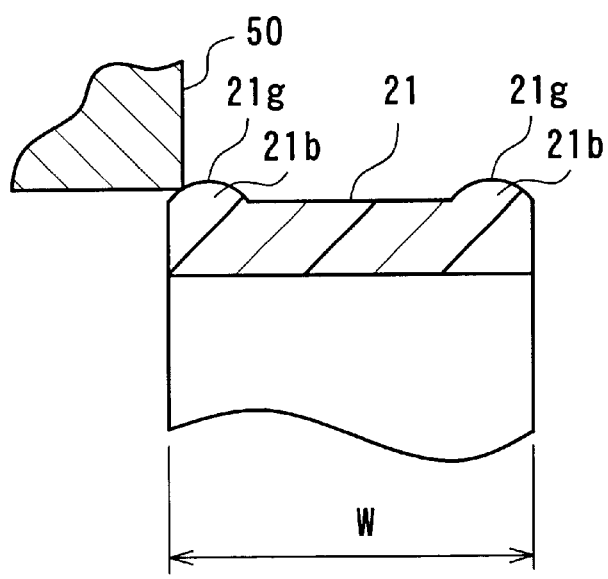
FIG. 18 is a sectional view of the one-way clutch in accordance with the third embodiment for showing a relation between the outer ring and an outer retainer being press-fitted therein.
Figure 19:
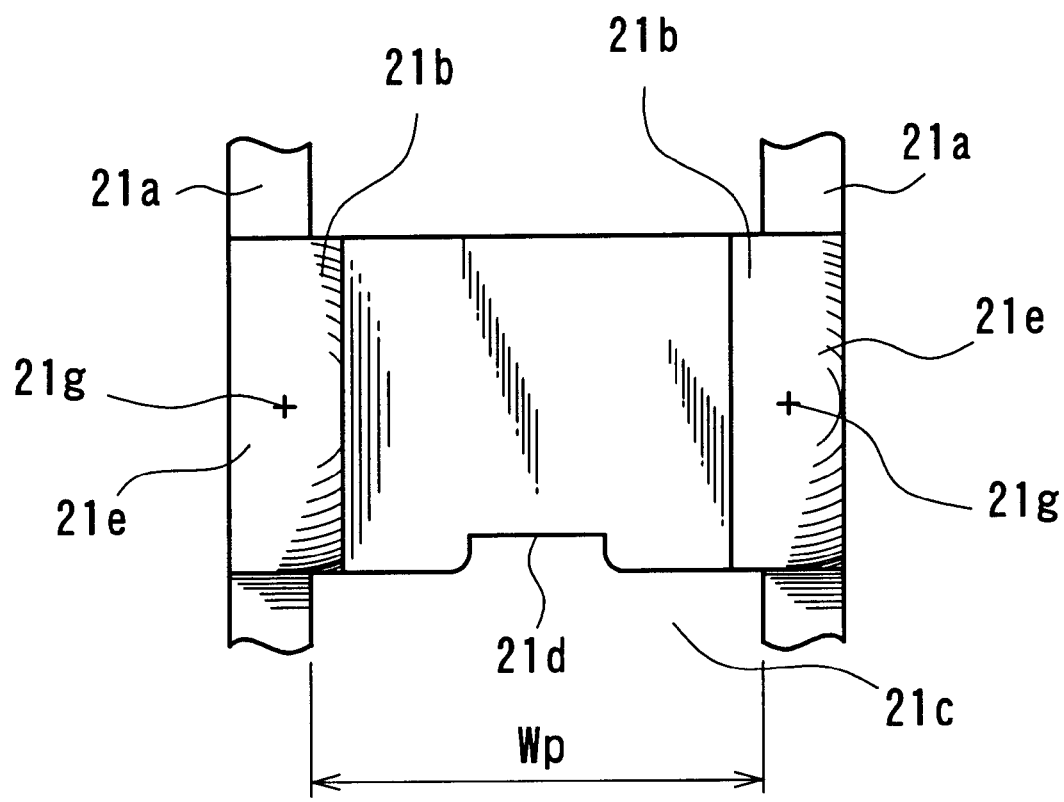
FIG. 19 is an equivalent view to FIG. 6 for showing the outer retainer in accordance with the third embodiment.
Figure 20:
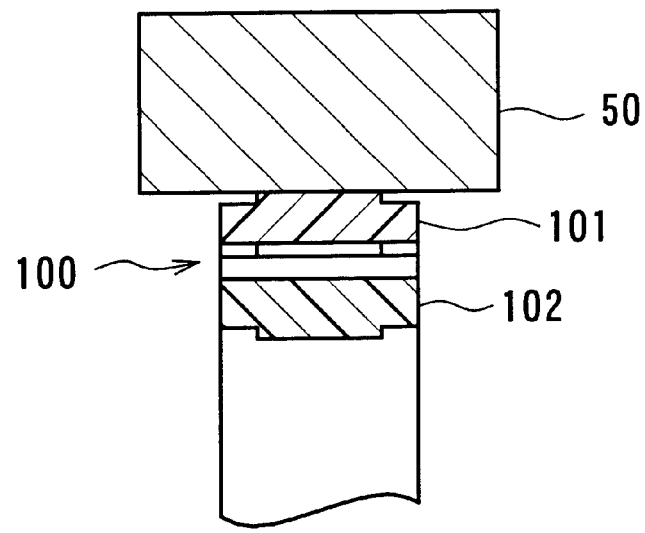
FIG. 20 is a diametrical sectional view showing a conventional one-way clutch press-fitted in the outer ring.
Figure 21:
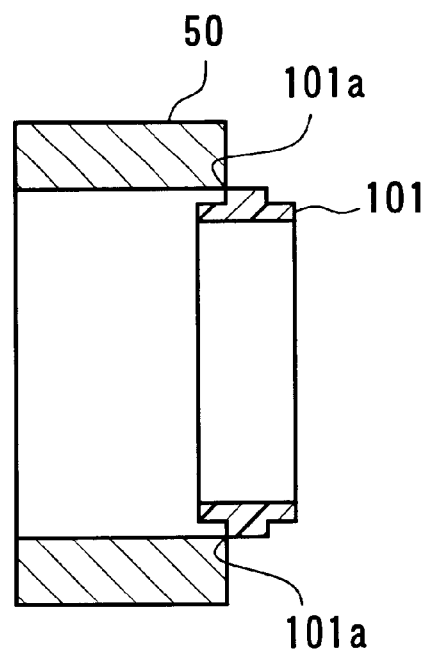
FIG. 21 is a sectional view showing an outer retainer being press-fitted in the outer ring of the conventional one-way clutch assembly.

FIG. 17 to FIG. 19 illustrate a one-way clutch 30 according to a third embodiment. FIG. 17 is a diametrical sectional view of the one-way clutch 30 press-fitted in the outer ring 50, whereas FIG. 18 is a sectional view showing a relation between the outer ring 50 and an outer retainer 21 being press-fitted therein. FIG. 19 corresponds to FIG. 6 showing the first embodiment. Although not contained herein, a front view of the outer retainer 21 is the same as FIG. 3. This embodiment differs from the first and second embodiments in the mode of the outer retainer 21.

Likewise to the first embodiment, the outer retainer 21 of this embodiment is integrally formed of the synthetic resin material in one molding step. The outer retainer 21 has a general annular shape and a predetermined axial width W (FIG. 18). An annular portion 21a, pocket 21c and recess 21d shown in FIG. 19 correspond to the like portions 1a, 1c and 1d of the first embodiment, respectively.

As shown in FIG. 18, the outer retainer 21 of the third embodiment is formed with a pair of projections 21b on its axially opposite ends, the projections having an outwardly projected arcuate form in diametrical section. A crest of the projection 21b also defines an arcuate edge in the circumferential direction. Therefore in FIG. 19, the outermost part is defined by the crest 21g of the projection 21b, the crest 21g being an intersection of the axial line (lateral direction as seen in the figure) and the circumferential line (perpendicular direction as seen in the figure) of the projection. Further, an axially outside portion of the crest 21g defines a slope 21e as the equivalent of the tapered surfaces 1e and 11e of the first and second embodiments. That is, the slope 21e is a chamfered face for the crest 21g of the projection 21b.

The pair of crests 21g support the outer retainer 11 through point contact with the outer ring 50. Therefore, an actual contact width between the outer retainer 11 and outer ring 50 with respect to the axial direction is equal to a contact width W3 corresponding to a distance between the crests 21g, as shown in FIG. 17. It is noted that the crests 21g are at axial positions relatively outward of the open width Wp of the pocket 21c as seen in FIG. 19. This ensures that the contact width W3 between the projection pair 21b and the outer ring 50, shown in FIG. 17, has as great value as the contact width W2 (FIG. 11) of the second embodiment.

When the one-way clutch 30 employing this outer retainer 21 is inserted into the outer ring 50, the projection 21b thereof abuts against the inside edge of the outer ring 50, as shown in FIG. 18. Thus, the outer retainer 21 is guided by the outer ring 50 in a manner to bring its axis into accurate alignment with the axis of the outer ring 50. Accordingly, the one-way clutch 30 is smoothly inserted into the outer ring 50. Likewise to the first embodiment, the one-way clutch 30 is readily assembled in the outer ring 50.

As mentioned supra, the contact width W3 between the outer retainer 21 and the outer ring 50 is greater than the contact width W1 of the first embodiment. Thus, the outer retainer 21 is less susceptible to the deformation due to thermal expansion, so that no great tensile stress occurs in its inside circumferential surface. Therefore, the crack occurrence is positively prevented. In addition, the outer retainer is readily press-fitted in the outer ring by virtue of the point contact between the projections 21b and the outer ring 50.

What is claimed is:

1. A one-way clutch comprising:

sprags circumferentially arranged at predetermined space intervals, an outer race and an inner retainer for respectively retaining an outer side and inner side of said sprags, and a spring for biasing said sprags in one circumferential direction, wherein said outer retainer has a general annular form with a predetermined axial width and includes outwardly projected projections and pockets with said sprags inserted therethrough, said projections and pockets being alternately arranged in the circumferential direction, wherein an outermost part at each of said projections has its axially opposite side edges chamfered;

said outer retainer and said projections are integrally made of resin material; and a contact width of said outermost part with an outer ring in an axial direction is greater than an open width of said pocket in an axial direction of said outer retainer.

2. The one-way clutch of claim 1, wherein said contact width is defined by a distance between the axially opposite side edges of said projection.

3. The one-way clutch of claim 1, wherein said projections are formed on axially opposite ends of said retainer, and said contact width is defined by a distance between crests of said projections.

* * * * *